(12) United States Patent
Park et al.

(10) Patent No.: US 11,475,354 B2
(45) Date of Patent: Oct. 18, 2022

(54) DEEP LEARNING METHOD

(71) Applicant: Cloudbric Corp, Seoul (KR)

(72) Inventors: Seung Young Park, Chuncheon-si (KR); Tai Yun Kim, Seoul (KR); Tae Joon Jung, Seoul (KR); Eun A Ko, Seoul (KR)

(73) Assignee: Cloudbric Corp, Seoul (KR)

( * ) Notice: Subject to any disclaimer, the term of this patent is extended or adjusted under 35 U.S.C. 154(b) by 955 days.

(21) Appl. No.: 16/243,031

(22) Filed: Jan. 8, 2019

(65) Prior Publication Data
US 2020/0019880 A1 Jan. 16, 2020

(30) Foreign Application Priority Data
Jul. 13, 2018 (KR) .................. 10-2018-0081940

(51) Int. Cl.
*G06N 20/00* (2019.01)
*H04L 9/40* (2022.01)
*G06K 9/62* (2022.01)
*G06V 10/426* (2022.01)
*G06V 30/10* (2022.01)

(52) U.S. Cl.
CPC ........... *G06N 20/00* (2019.01); *G06K 9/6262* (2013.01); *G06V 10/426* (2022.01); *H04L 63/1416* (2013.01); *G06V 30/10* (2022.01)

(58) Field of Classification Search
None
See application file for complete search history.

(56) References Cited

U.S. PATENT DOCUMENTS

| | | | | |
|---|---|---|---|---|
| 8,984,640 | B1* | 3/2015 | Emigh | H04B 1/667 726/13 |
| 8,990,928 | B1* | 3/2015 | Emigh | H04N 19/48 726/22 |
| 9,172,629 | B1* | 10/2015 | McRae | H04L 45/00 |
| 2012/0239731 | A1* | 9/2012 | Shyamsunder | G06F 16/955 709/203 |
| 2017/0093648 | A1* | 3/2017 | ElArabawy | H04L 43/0817 |
| 2017/0293874 | A1* | 10/2017 | Asaf | G06N 3/0436 |
| 2018/0007070 | A1* | 1/2018 | Kulkarni | H04L 63/1425 |
| 2018/0097822 | A1* | 4/2018 | Huang | G06N 20/00 |
| 2020/0053119 | A1* | 2/2020 | Schnieders | G06V 30/245 |

FOREIGN PATENT DOCUMENTS

KR 20090079330 * 7/2009 ........... H04L 41/147
KR 10-2018-0066643 A 6/2018

* cited by examiner

*Primary Examiner* — Scott B Christensen
(74) *Attorney, Agent, or Firm* — Revolution IP, PLLC

(57) ABSTRACT

Provided is a deep learning method including a step of each of at least two or more deep learning machines learning a web traffic by using a hexadecimal; a step of the deep learning machines learning the web traffic by using an incremental learning using a weight; a step of, when the web traffic is received, each of the deep learning machines encoding a character string of the web traffic with UTF-8 hexadecimal; a step of each of the deep learning machines converting the character string into an image and deep learning the image.

2 Claims, 5 Drawing Sheets

DEEP LEARNING METHOD

TECHNICAL FIELD

The present disclosure relates to a deep learning method.

RELATED ART

The deep learning is a technology with which a machine can learn a specific data type and make recognition, inference and determination by itself, like a human. For example, the deep learning is a technology enabling the machine to learn tens of thousands of pictures and to recognize what a new picture is by itself.

In the deep learning, data is recognized as an image and the learning is made through a plurality of data compressions and processing.

While there are many algorithms designed to recognize the image, there is little algorithm designed to recognize a character string. An algorithm capable of recognizing the character string is generally designed to recognize only 68 characters. That is, in the deep learning method of the related art, 68 characters consisting of 26 English small letters, 10 numbers and 32 symbols are converted into images, which are then learned by a deep learning module.

However, in order to apply the deep learning to a web traffic (also referred to as web address or URL), the deep learning module is required to recognize the languages in the world and to distinguish capital letters and small letters.

The reason is that the web traffic (URL) is not composed of English only but can be made by any language in the world and English meanings are also different depending on the capital or small letters. Therefore, when the deep learning module is configured to recognize only the 68 characters, it is difficult to properly learn the web traffic.

Also, it is not possible to enable the deep learning module having completed the learning with predetermined data to additionally learn new data. That is, the deep learning module cannot continue to accumulatively learn new data.

Therefore, when applying the deep learning to the web traffic (URL), the accuracy of the deep learning module is lowered over time or as a weight on the new data test increases. The reason is that when a site is once reformed or a new page is added to the site, a possibility that the web traffic (URL) having a type totally different from the previously learned data will be used increases.

CITATION LIST

Patent Documents

Patent Document 1: KR-A-10-2018-0066643 (Product searching system using deep learning based on image comparison and method thereof)

SUMMARY OF THE INVENTION

Problems to be Solved by the Invention

The present disclosure has been made in view of the above situations, and an object thereof is to provide a deep learning method, in which hexadecimal image conversion and incremental learning for web traffic learning are applied, capable of recognizing a web traffic (URL) by using hexadecimal, and increasing a recognition rate of the web traffic (URL) by using incremental learning.

Means for Solving the Problems

In order to achieve the above technical object, a deep learning method of the present disclosure, in which hexadecimal image conversion and incremental learning for web traffic learning are applied, includes a step of each of at least two or more deep learning machines learning a web traffic by using a hexadecimal; and a step of the deep learning machines learning the web traffic by using an incremental learning using a weight, wherein the step of each of the at least two or more deep learning machines learning the web traffic by using the hexadecimal includes a step of, when the web traffic is received, each of the deep learning machines encoding a character string of the web traffic with UTF-8 hexadecimal and a step of each of the deep learning machines converting the character string into an image and deep learning the image, and wherein the step of learning the web traffic by using the incremental learning includes a step of a deep learning machine 1 of the deep learning machines learning first to third week data, a deep learning machine 2 learning second to fourth week data and a deep learning machine 3 learning third to fifth week data to thereby overlap the data to be learned by the deep learning machines, a step of testing the deep learning machines by using some data, for which determination has been already made by an administrator, of the fifth week data, and a step of setting a weight for each of the deep learning machines by using a result of the test.

Effects of the Invention

The present disclosure is to solve the problems that can be caused when applying the deep learning to the web traffic (URL), and achieves following effects.

First, as compared to the deep learning algorithm of the related art capable of recognizing only the 68 characters, according to the present disclosure, the deep learning module is enabled to recognize the UTF-8 hexadecimal, so that the deep learning module can learn the web traffic.

The deep learning module is enabled to recognize the UTF-8 hexadecimal, so that the deep learning module can express 256 English letters with two hexadecimal channels and 16,777,216 Korean letters with six hexadecimal channels. In this case, the English letter has 1 byte, and the Korean letter has 3 bytes.

Second, a traffic of a new pattern is likely to be input to a website due to characteristics of the website. In the related art, it is difficult for the deep learning module having completed the learning once to additionally learn new data. In order to solve this problem, the present disclosure uses the incremental learning. That is, according to the present disclosure, the plurality of deep learning modules in which cycles of data to be learned are different is used and the weight depending on an error rate is designated to each module, so that the accuracy of the deep learning is improved.

Third, according to the present disclosure, it is possible to rapidly recognize the hacking and to quickly cope with the same by increasing the accuracy of the deep learning on the web traffic (URL).

BRIEF DESCRIPTION OF THE DRAWINGS

Other and further objects, features and advantages of the present disclosure will be more explicit from the following detailed description taken with reference to the drawings wherein.

DETAILED DESCRIPTION OF ILLUSTRATIVE EMBODIMENTS

Hereinafter, an illustrative embodiment of the present disclosure will be described in detail with reference to the accompanying drawings.

Figure 1:
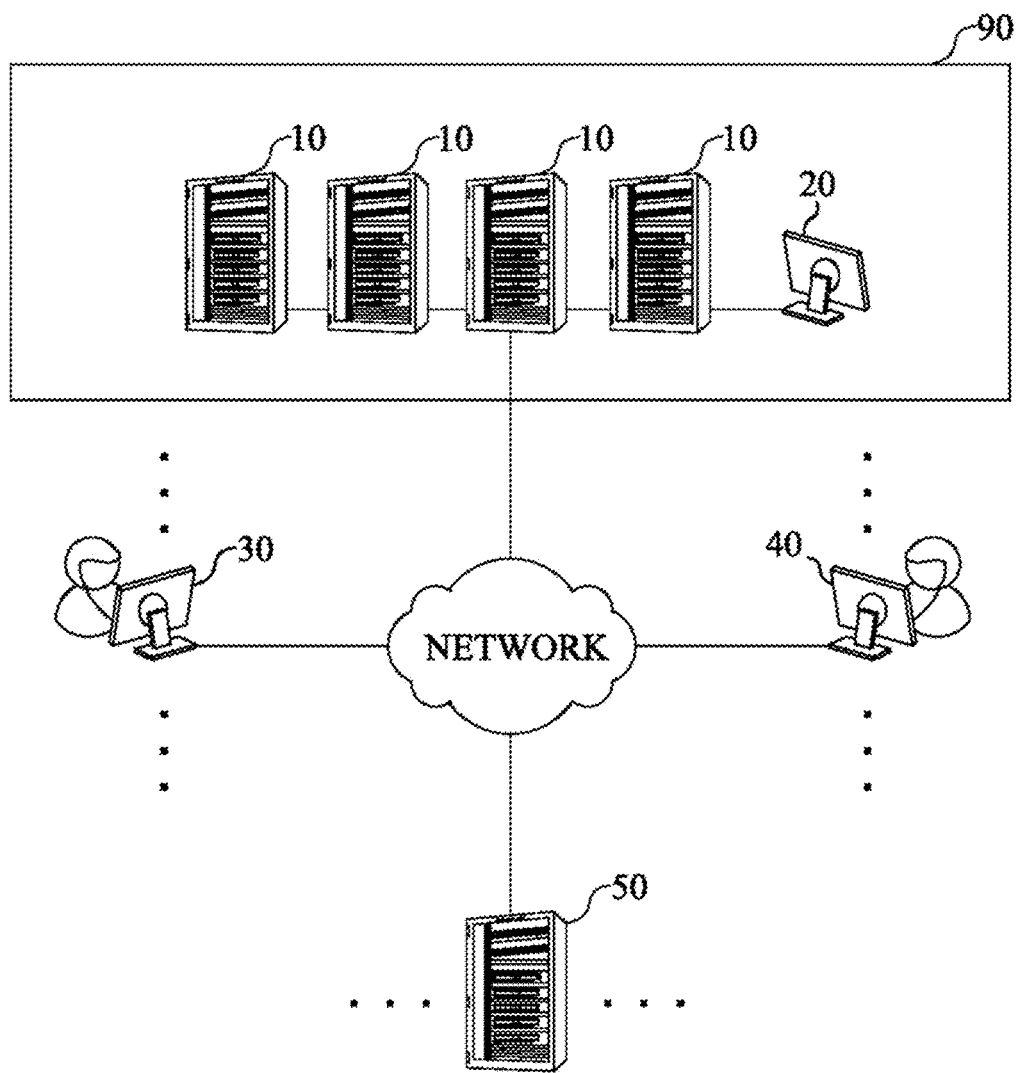
FIG. 1 is a configuration view depicting an illustrative embodiment of a deep learning system to which the deep learning method of the present disclosure, in which hexadecimal image conversion and incremental learning for web traffic learning are applied, is applied.

FIG. 1 is a configuration view depicting an illustrative embodiment of a deep learning system to which the deep learning method of the present disclosure, in which hexadecimal image conversion and incremental learning for web traffic learning are applied, is applied.

As shown in FIG. 1, the deep learning system to which the deep learning method of the present disclosure (hereinafter, simply referred to as 'deep learning method'), in which hexadecimal image conversion and incremental learning for web traffic learning are applied, is applied includes at least two or more deep learning machines 10, a control server 20 configured to control and manage the deep learning machines 10, user terminals 30 that are used by general users, hacker terminals 40 that are used by hackers, and a company server 50 configured to receive and operate a deep learning solution, which is generated in accordance with the present disclosure, from a management company 90 for managing the deep learning machines 10.

The management company 90 can execute the deep learning method of the present disclosure to generate the deep learning solution and to directly detect a web traffic attack or provide the deep learning solution to the company server 50 having business alliance relationship.

The company server 50 is a server configured to provide the user terminal 30 with diverse services, and has the deep learning solution mounted therein. Therefore, when a hacker having an illegal intention tries to hack a web traffic of the company server 50 with the hacker terminal 40, the deep learning solution can interrupt the hacking. In the present disclosure, the web traffic means a web address or a URL.

That is, the management company 90 uses the deep learning method of the present disclosure to develop the deep learning solution capable of preventing the hacking through the web traffic and directly uses the same, and can provide the deep learning solution to the company server 50.

The company server 50 is managed by a company that provides the general users with the services, and can interrupt the hacking through the web traffic by using the deep learning solution.

The deep learning method of the present disclosure has following features.

For example, according to the present disclosure, the four deep learning machines 10 perform learning of using the hexadecimal to recognize character strings and perceiving character strings relating to the hacking. In this case, the four deep learning machines perform the learning with data overlapping each other, and a weight of each deep learning machine is determined depending on results of primary learning and test.

In a state where the weights are determined, the deep learning machines can determine whether or not the hacking by analyzing a web traffic to be newly received.

That is, in the state where the weights are determined, the deep learning machines analyze the newly collected data, i.e., the web traffics, detect whether the web traffic is attacked or not, and may interrupt or exceptionally process the web traffic in accordance with a result thereof.

Additionally describing, according to the present disclosure, for example, the four deep learning machines perform learning of using the hexadecimal to recognize character strings and perceiving character strings relating to the hacking. In this case, the four deep learning machines perform the learning with data overlapping each other, and the weight of each deep learning machine is determined depending on results of primary learning and test.

In the state where the weights are determined, the deep learning machines analyze the web traffic to determine whether the web traffic is attacked (hacked).

In this case, the deep learning machines may be all used to detect the web traffic attack. Alternatively, an analysis algorithm extracted from the deep learning machines may be generated as a separate deep learning solution, so that one deep learning machine having the deep learning solution mounted therein, for example, the company server 50 may detect the web traffic attack. Alternatively, one server configured to control the deep learning machines, for example, the control server 20 may detect the web traffic attack.

Additionally describing, the deep learning method of the present disclosure includes a step of each of at least two or more deep learning machines learning a web traffic by using a hexadecimal; and a step of the deep learning machines learning the web traffic by using an incremental learning using a weight.

Here, the step of each of the at least two or more deep learning machines learning the web traffic by using the hexadecimal includes a step of, when the web traffic is received, each of the deep learning machines encoding a character string of the web traffic with UTF-8 hexadecimal and a step of each of the deep learning machines converting the character string into an image and deep learning the image.

Also, the step of learning the web traffic by using the incremental learning includes a step of a deep learning machine 1 of the deep learning machines learning first to third week data, a deep learning machine 2 learning second to fourth week data and a deep learning machine 3 learning third to fifth week data to thereby overlap the data to be learned by the deep learning machines, a step of testing the deep learning machines by using some data, for which determination has been already made by an administrator, of the fifth week data, and a step of setting a weight for each of the deep learning machines by using a result of the test.

In this case, the deep learning machines for which the weights are respectively set detect the web traffic attack.

In the below, the deep learning method of the present disclosure that is to be executed by the deep learning machines 10 is described.

Figure 2:
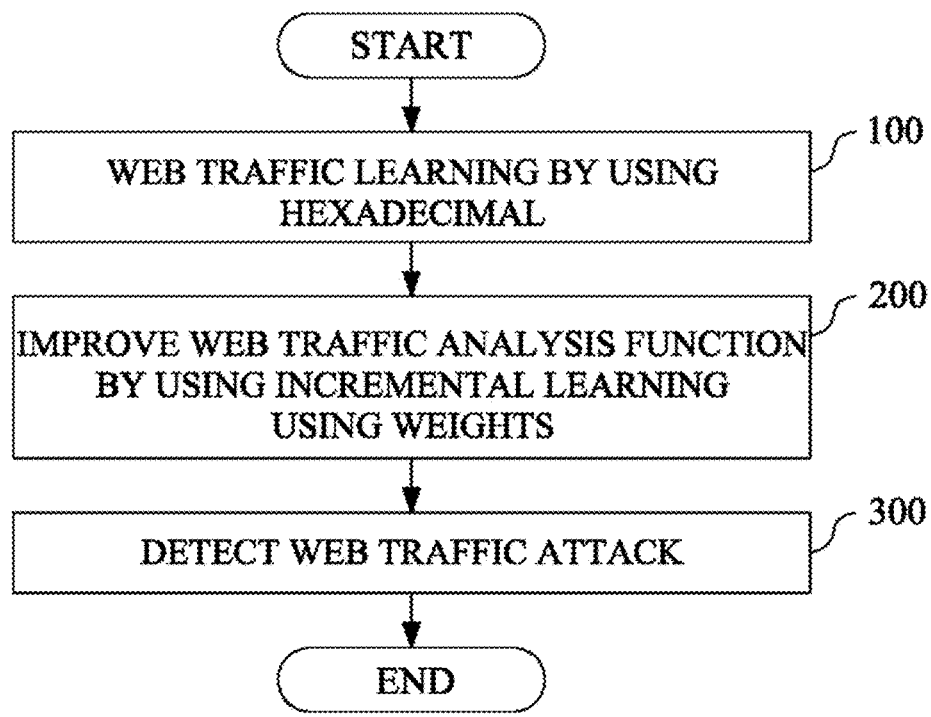
FIG. 2 is a flowchart of an illustrative embodiment of the deep learning method of the present disclosure, in which the hexadecimal image conversion and the incremental learning for web traffic learning are applied.
Figure 3:
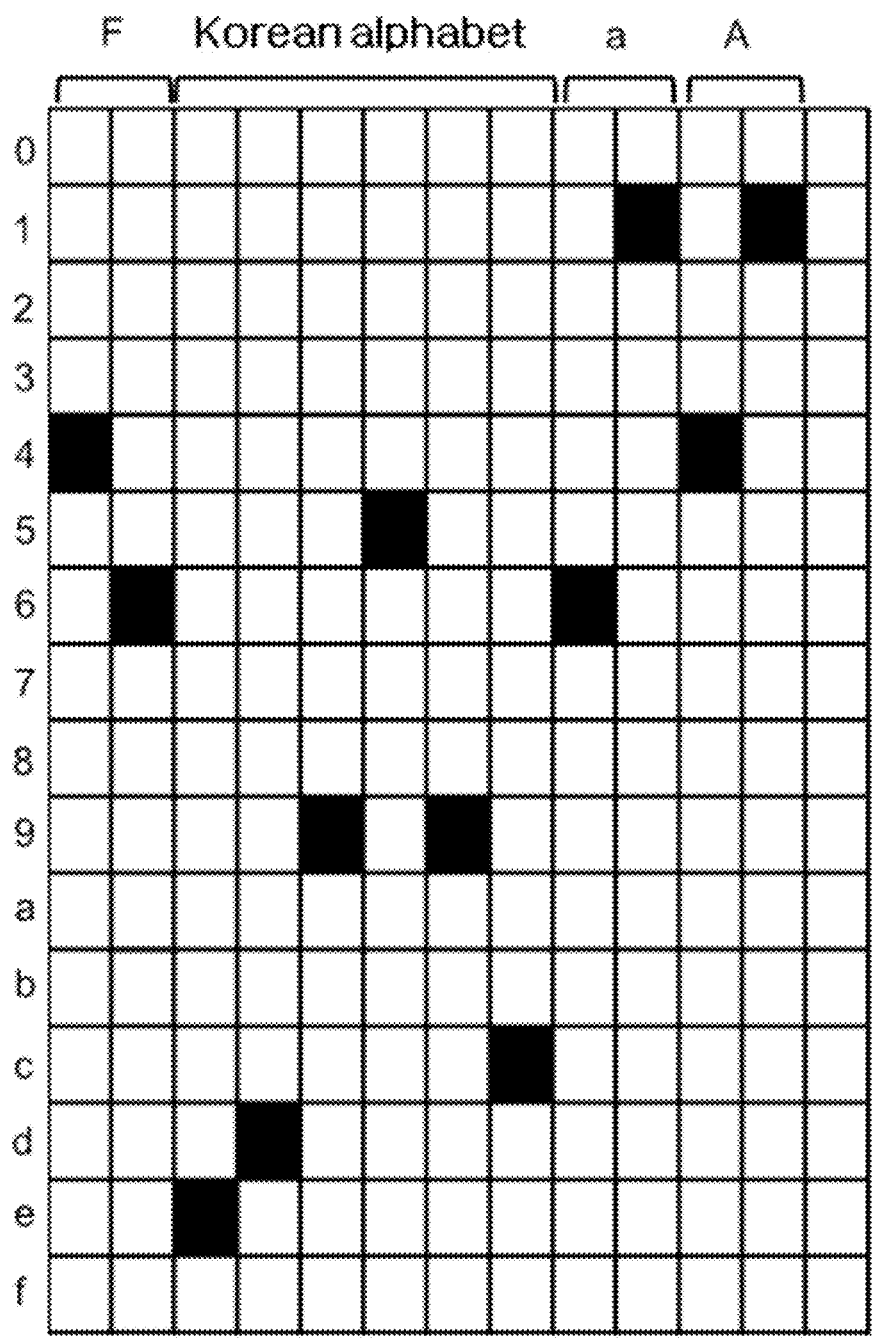
FIG. 3 illustrates a hexadecimal utilizing method to be applied to the deep learning method of the present disclosure, in which the hexadecimal image conversion and the incremental learning for web traffic learning are applied.

FIG. 2 is a flowchart of an illustrative embodiment of the deep learning method of the present disclosure, in which the hexadecimal image conversion and the incremental learning for web traffic learning are applied, and FIG. 3 illustrates a hexadecimal utilizing method to be applied to the deep learning method of the present disclosure, in which the hexadecimal image conversion and the incremental learning for web traffic learning are applied.

As shown in FIG. 2, the deep learning method of the present disclosure includes a step (100) of the deep learning machine 10 converting a web traffic into an image by using the hexadecimal and recognizing the web traffic, a step (200) of the at least two or more deep learning machines 10 analyzing the imaged web traffic by using the incremental learning using the weights to thereby improve a web traffic analysis function, and a step (300) of using the analysis function to detect a web traffic attack.

According to the present disclosure, the deep learning machine is enabled to continuously learn the web traffic, so that it is possible to keep the accuracy of the web traffic analysis.

The main features of the present disclosure are described.

First, according to the present disclosure, the web traffic is converted into the image by using the hexadecimal, so that the web traffic can be recognized.

For the web traffic, the languages of diverse countries are used. Even in the case of English, both the capital and smaller letters are used for the web traffic. However, it is not possible to express the English capital letters and the other languages by the 68 character strings of the related art.

That is, in order to apply the web traffic to the deep learning, more character strings should be recognized more rapidly. In order to meet this condition, the present disclosure uses a UTF-8 hexadecimal format.

That is, the web traffic is managed using the UTF-8 hexadecimal, so that the more character strings can be recognized, as compared to the related art.

According to the present disclosure, since the UTF-8 hexadecimal is used, 16 channels are used.

In the present disclosure, the UTF-8 hexadecimal is used in an encoding/decoding manner.

When the UTF-8 hexadecimal is used, A can be converted into 41, J can be converted into 4a, and j can be converted into 6a, for example.

When the deep learning machine is notified that "41" is the UTF-8 hexadecimal type, the deep learning machine can decode "41" and recognize the same as "A".

However, the deep learning machine configured to use the deep learning method for the web traffic receives information in which the web traffic is imaged. Therefore, it is not possible to enable the deep learning machine to learn that "A" has a value of "41" simply by converting "A" into "41".

In order to enable the deep learning machine, which could learn only the 68 character strings, to learn DBFC, it is necessary to enable the deep learning machine to learn an image as shown in FIG. 3.

For example, each space in a table shown in FIG. 3 can be a pixel (image), an item on an X-axis of the table, i.e., a horizontal axis indicates an input value, and an item on a Y-axis, i.e., a vertical axis means a character matched with each space.

That is, in order for the deep learning machine to receive a URL format of a web page, it is necessary to perform image conversion for the UTF-8 hexadecimal.

Additionally describing, in the present disclosure, the UTF-8 hexadecimal format can be expressed with being imaged.

In the related art, when a capital letter is converted into a small letter and a character belonging to the 68 characters is thus input, it is converted into one-hot vector of 68 dimensions, and when a character, which does not belong to the 68 characters, is input, it is converted into zero vector of 68 dimensions, i.e., ignored.

However, according to the present disclosure, the capital letter is not converted into the small letter, is just read by the encoding method (UTF-8 is not necessarily required) supporting the Unicode and is stored in bits in a computer.

For example, the English alphabet is stored in 8 bits per letter and the Korean alphabet is stored in 16 bits per letter. According to the present disclosure, the bits are converted into the hexadecimal in a unit of 4 bits. That is, according to the present disclosure, the English alphabet is converted into two-digit hexadecimal per letter, and the Korean alphabet is converted into four-digit hexadecimal per letter.

When the conversion is performed, all letters are expressed by the hexadecimal. Therefore, the final character string to be converted can be composed of only one of 0123456789abcdef. That is, each letter can be one hot vector of 16 dimensions.

By the above operation, a character string consisting of English only may be doubled (because of two hexadecimals per letter). Thereby, a memory amount that is used for neural network training may increase and the memory amount may be influenced by a length of the input character string.

The feature of the present disclosure in which the hexadecimal is used is again summarized.

In the related art, only the 68 character strings can be recognized. However, according to the present disclosure, the hexadecimal is utilized, so that the present disclosure can recognize the more character strings than the 68 the character strings.

Particularly, according to the present disclosure, when the web traffic is received, each of the deep learning machines 10 encodes the character string into the UTF-8 hexadecimal, converts the character string into the image, and deep learns the image.

That is, the configuration where the present disclosure uses the hexadecimal means that the deep learning machine 10 expresses the character string of the web traffic with the UTF-8 hexadecimal.

The feature of the present disclosure is to encode the web traffic with the UTF-8 hexadecimal, to image the same and to use the imaged information for the deep learning.

Second, the present disclosure uses the incremental learning.

When a structure of a site is changed or reformed, the format of the web traffic, which is conventionally accessed, is remarkably changed. Therefore, the accuracy of the deep learning machine that has been conventionally used may be lowered. That is, according to the deep learning method of the related art, as time elapses after the deep learning machine has learned the web traffic, the accuracy of the deep learning machine to analyze the web traffic and to perceive whether or not the hacking may be lowered. In the related art, it is difficult to update the deep learning machine with additional data.

In order to solve the above problem, the present disclosure uses the incremental learning.

According to the incremental learning, the deep learning machine can be updated with the additional data. Therefore, when one deep learning machine makes a wrong determination, the other deep learning machine that is used together can correct the wrong determination.

Additionally describing, the incremental learning is a method of designating a weight depending on an error rate to each deep learning machine to thereby minimize an error of each deep learning machine while managing one deep learning machine, which cannot perform further learning, together with the other deep learning machines having different learning cycles.

In the incremental learning method of the related art, only new data is learned without data overlapping in each deep learning machine. For example, in the incremental learning method of the related art, the deep learning machine 1 is enabled to learn only first week data, the deep learning machine 2 is enabled to learn only second week data, and the deep learning machine 3 is enabled to learn only third week data. This is not problematic when a pattern of the web traffic is constant. However, the pattern of the web traffic can be easily changed. Therefore, when an error rate is calculated in a state where each deep learning machine has performed the learning only for a specific cycle and a weight is designated to each deep learning machine, only a result of one deep learning machine may be overrated.

In order to prevent the above, according to the present disclosure, the cycles of data that is to be learned by the deep learning machines are designed to overlap each other. For example, the deep learning machine 1 may be set to learn first to fourth week data, the deep learning machine 2 may be set to learn second to fifth week data, and the deep learning machine 3 may be set to learn third to sixth week data.

Also, according to the present disclosure, the error rate of each machine can be calculated with the latest data, and the deep learning machine having the lowest error rate can be used as a deep learning machine for detection.

In this case, the weight may be designated to each deep learning machine, depending on the error rate of the deep learning machine.

That is, according to the present disclosure as described above, it is possible to prevent one deep learning machine from making an overvaluation and the characteristics of the web traffic can be considered.

The feature of the present disclosure in which the incremental learning is used is again summarized.

The best feature of the incremental learning that is used by the present disclosure is that the deep learning machine 1 learns first to third week data, the deep learning machine 2 learns second to fourth week data and the deep learning machine 3 learns third to fifth week data and the data to be learned by the deep learning machines are thus overlapped, for example.

In this case, about 10% of the fifth week data is not learned by the deep learning machines and the non-learned data is used for test.

When the three deep learning machines are tested by the extra data of 10%, the error rate (accuracy) of each deep learning machine can be perceived.

The reason is that the extra data of 10% is data already determined as to whether it is true positive or false positive by the administrator.

Figure 5:
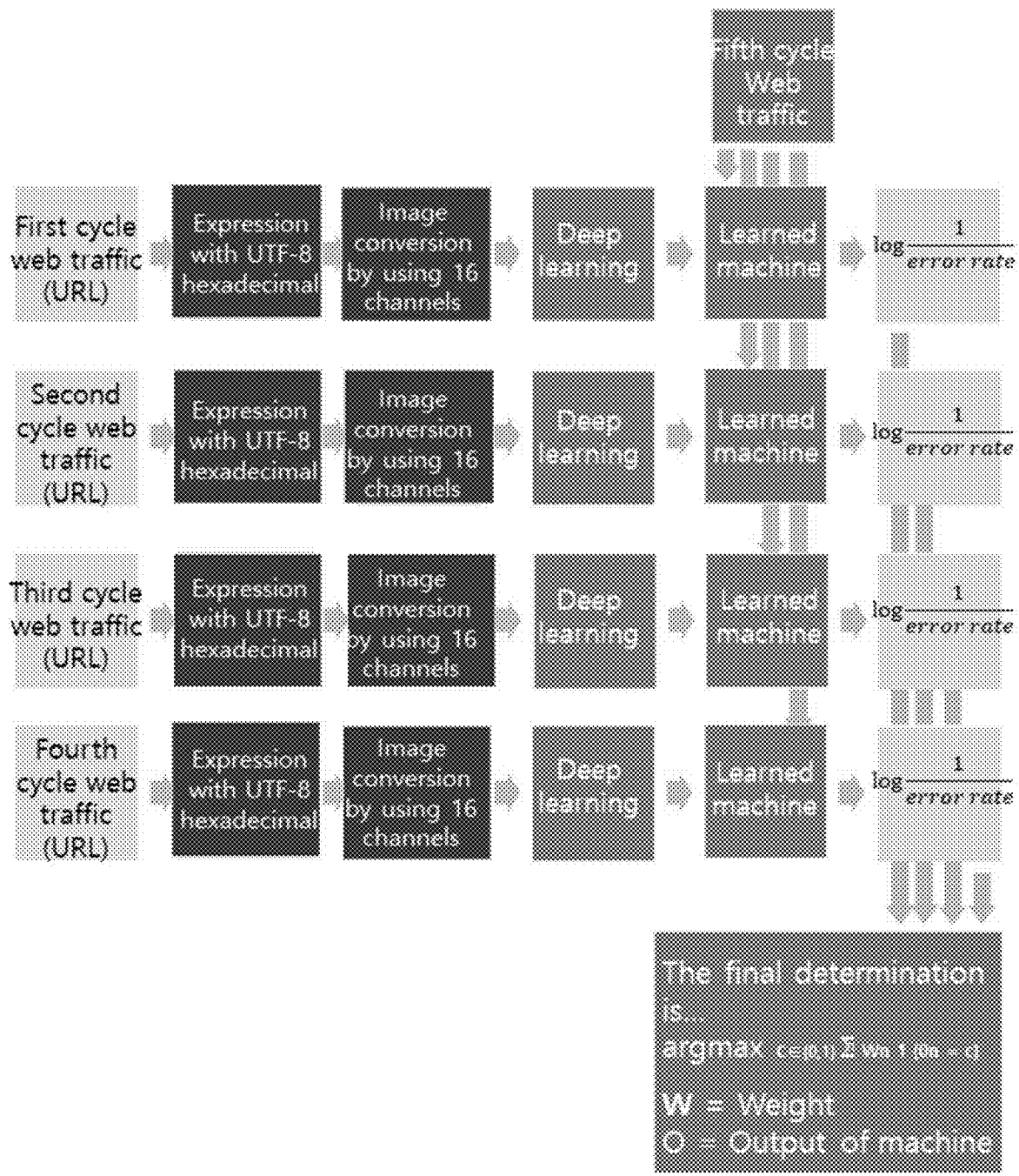
FIG. 5 illustrates an incremental learning method of the deep learning method of the present disclosure, in which the hexadecimal image conversion and the incremental learning for web traffic learning are applied.

Based on the accuracy (error rate), the weight of each deep learning machine can be set by a formula shown in FIG. 5. That is, the greater weight may be set to the machine having the higher accuracy, and the smaller weight may be set to the machine having the lower accuracy.

Through the above processes, the web traffic analysis function can be finally improved.

In the below, the feature of the present disclosure in which the hexadecimal is utilized is described in detail with reference to FIG. 4, and the feature of the incremental learning is described in detail with reference to FIG. 5.

Figure 4:
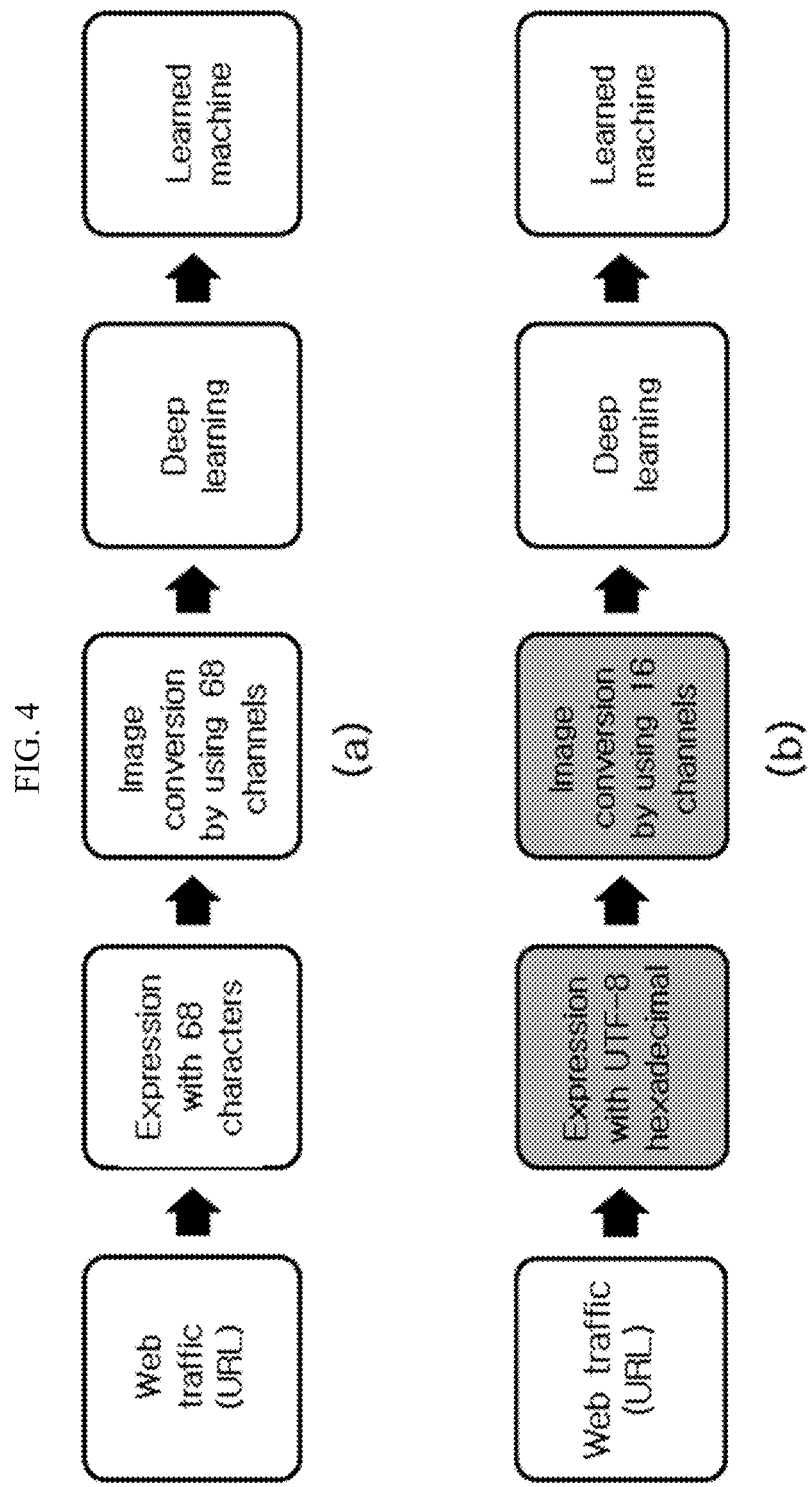
FIG. 4 illustrates a method of using the hexadecimal in the deep learning method of the present disclosure, in which the hexadecimal image conversion and the incremental learning for web traffic learning are applied.

FIG. 4 illustrates a method of using the hexadecimal in the deep learning method of the present disclosure, in which the hexadecimal image conversion and the incremental learning for web traffic learning are applied. FIG. 4(*a*) depicts the deep learning method of the related art, and FIG. 4(*b*) depicts the deep learning method of the present disclosure.

As shown in FIG. 4(*a*), according to the deep learning method of the related art, when the web traffic is received, the machine converts the web traffic into an image by using the 68 channels so as to express the web traffic with the 68 characters, performs the deep learning for the converted image, and finally completes the learning.

However, as shown in FIG. 4(*b*), according to the deep learning method of the present disclosure, when the web traffic is received, the machine converts the web traffic into an image by using the 16 channels so as to express the web traffic with the hexadecimal, performs the deep learning for the converted image, and finally completes the learning.

That is, according to the present disclosure, the web traffic that could be expressed with only the 68 characters can be expressed with 256 characters by using the two hexadecimal channels with respect to the English letters and can be expressed with 16,777,216 characters by using the six hexadecimal channels with respect to the Korean letters.

In this case, the English letter can be expressed by 1 byte, and the Korean letter can be expressed by 3 bytes.

That is, according to the present disclosure, it is possible to recognize all types of the web traffic consisting of diverse characters and patterns, so that it is possible to detect all types of hackings.

The hexadecimal conversion is additionally described.

The meaning of the web traffic, i.e., the URL may be considerably changed due to the difference of the capital and small letters and the difference of the languages, contrary to the existing character strings. In the related art, when a character other than the 68 character strings is input as the web traffic, the character is treated as a blank (the capital letter is replaced with the small letter).

For example, when "https://www.asdf.com/badfile.exe" is successful, i.e., the corresponding operation is normally performed, the attack (hacking) may be made. However, in the related art, since the above is recognized as "https://www.asdf.com/.exe", "https://www.asdf.com/.exe" is not executed.

However, if the deep learning machine learns "https://www.asdf.com/.exe" as attack, i.e., hacking upon the learning, when https://www.asdf.com/goodfile.exe" is later received, the deep learning machine may determine "https://www.asdf.com/goodfile.exe" as attack, although "https://www.asdf.com/goodfile.exe" is not attack. Therefore, such error should be corrected. To this end, the present disclosure uses the UTF-8 hexadecimal.

That is, when the UTF-8 hexadecimal is used, the more character strings can be recognized. Therefore, the deep learning machine can recognize the more diverse information to provide the more diverse analysis results.

Also, when the UTF-8 hexadecimal is used, it is possible to rapidly store the information about the more character strings while minimizing the increase in memory.

FIG. 5 illustrates the incremental learning method of the deep learning method of the present disclosure, in which the hexadecimal image conversion and the incremental learning for web traffic learning are applied.

The incremental learning method that is applied to the present disclosure has following features.

First, the incremental learning method that is applied to the present disclosure can calculate the error rate of the machine having performed the learning for each cycle and correspondingly designate the weight.

Second, the incremental learning method that is applied to the present disclosure can minimize an error of one machine by operating a plurality of machines at the same time.

Third, the incremental learning method that is applied to the present disclosure can rapidly recognize a new web traffic, so that it is possible to take immediate measures with respect to the new web traffic.

The incremental learning method that is applied to the present disclosure is not limited to the four deep learning machines as shown in FIGS. 1 and 4. That is, the number and learning cycles of the deep learning machines to be applied to the present disclosure can be diversely changed depending on the situations.

The incremental learning is additionally described.

In general, however hard the deep learning machine performs the learning, the deep learning machine cannot determine with 100% accuracy whether the web traffic is hacked. This inaccurate part is referred as the error rate. As time goes by, the learning basis of the deep learning machine becomes old data but the web traffic is always changed. Therefore, the accuracy of the deep learning machine gradually decreases.

Also, according to the method of the related art, it is not possible to enable the deep learning module having already completed the learning to additionally learn new data.

In order to solve this problem, according to the present disclosure, the deep learning machine having learned new data is used together with the deep learning machine having learned old data. This method is referred to as incremental learning.

For example, in the method of the related art, it is assumed that the deep learning machine 1 has learned first week data, the deep learning machine 2 has learned second week data and the deep learning machine 3 has learned third week data. In this case, the deep learning machine 3 performs the learning with data in which about 10% data has been excluded from the third week data.

In this case, when the three deep learning machines are tested by the excluded data of 10%, the error rates are calculated for the three deep learning machines.

When the error rates are calculated, the weight is designated to each deep learning machine.

For example, when it is assumed that the error rate of the deep learning machine 1 is 3%, the error rate of the deep learning machine 2 is 2% and the error rate of the deep learning machine 3 is 1%, the weight of the deep learning machine 1 is about 1.5, the weight of the deep learning machine 2 is about 1.7 and the weight of the deep learning machine 3 is about 2 by a formula of log (1/error rate).

In this case, when the deep learning machine 1 determines the new web traffic as attack (hacking), the deep learning machine 2 determines the same as non-attack and the deep learning machine 3 determines the same as attack, the final result may be determined as attack. That is, the final determination result can be calculated, considering the weights of the deep learning machines and the determination results.

Thereafter, at a next learning cycle, the deep learning machine 1 is removed and a deep learning machine 4 is newly added.

That is, in the related art, since the data that is learned by the deep learning machines does not overlap, a weight of a specific machine may be considerably leaned toward one side. The reason is that when the test data for calculating the error rate is the web traffic having a new pattern, the error rate of the deep learning machine having learned the latest data is low and the error rates of the other deep learning machines are high.

Therefore, when the error rate of the deep learning machine 1 is 30%, the error rate of the deep learning machine 2 is 20% and the error rate of the deep learning machine 3 is 5%, the weight of the deep learning machine 1 may be set to about 0.5, the weight of the deep learning machine 2 may be set to about 0.7 and the weight of the deep learning machine 3 may be set to about 1.3 by the formula of log (1/error rate).

In this case, even when the deep learning machine 1 and the deep learning machine 2 are right and the deep learning machine 3 is wrong with a probability of 5%, the result of the deep learning machine 3 becomes unconditionally the final result.

However, when the learning periods overlap, like the present disclosure, for example, when the deep learning machine 1 is set to learn the first to fourth week data, the deep learning machine 2 is set to learn the second to fifth week data and the deep learning machine 3 is set to learn the third to sixth week data, as described above, each deep learning machine learns the old data and the new data at the same time, so that it is possible to prevent the weight from being leaned toward one side.

The reason is that the deep learning machine has learned not only the new data but also the existing data.

One skilled in the art relating to the present disclosure can understand that the present disclosure can be implemented in other specific forms without changing the technical spirit or essential features thereof. Therefore, the above illustrative embodiments should be construed in all respects as exemplary not restrictive. The scope of the present disclosure being indicated by the claims rather than by the foregoing description and all changes or modifications which come within the meaning and the range of equivalency of the claims are therefore intended to be embraced therein.

The invention claimed is:

1. A deep learning method in which hexadecimal image conversion and incremental learning for web traffic learning are applied, the deep learning method comprising:
   converting, by at least one deep learning machine of a plurality of deep learning machines, a web traffic into an image by using a hexadecimal, wherein the converting is capable of being applied to different alphabets;
   analyzing, by three or more of the plurality of deep learning machines, the image; and
   processing the web traffic based on the analyzing,
   wherein converting the web traffic into the image further comprises:
      in response to detection of the web traffic being received from one or more user terminals, encoding a character string of the web traffic with UTF-8 hexadecimal for recognizing various types of character strings, wherein the web traffic may be in any of a plurality of different alphabets, and
      converting the encoded character string into an image representing the web traffic and deep learning the image, and
   wherein analyzing the image further comprises:
      determining a weight for each of a first, second, and third deep learning machine of a plurality of deep learning machines for improving accuracy of deep learning associated with web traffic by using an incremental learning using the determined weight, wherein the weights are determined by:

acquiring a plurality of weeks of data corresponding to previously received web traffic, wherein the previously received web traffic was converted into corresponding images by using hexadecimal, the previously received web traffic being capable of being represented in the plurality of different alphabets;

learning first to third week data of the plurality of weeks of data by the first deep learning machine of the plurality of deep learning machines, learning second to fourth weeks data of the plurality of weeks of data by the second deep learning machine of the plurality of deep learning machines different from the first deep learning machine, learning third to fifth week data of the plurality of weeks of data by the third deep learning machine of the plurality of deep learning machines different from the first deep learning machine and the second deep learning machine to thereby overlap the data to be learned by the first, second and third deep learning machines, testing the first, second and third deep learning machines by using the fifth week data, the fifth week data having already having been manually determined, and analyzing the web traffic by each of the three or more of the plurality of deep learning machines using the image based on the determined weights.

2. The deep learning method according to claim 1, wherein the processing further comprises detecting a web traffic attack based on the analyzing.

* * * * *